(12) United States Patent
Araki et al.

(10) Patent No.: US 10,532,526 B2
(45) Date of Patent: Jan. 14, 2020

(54) METHOD FOR PRODUCING THIN POLARIZING FILM

(75) Inventors: Tatsuya Araki, Ibaraki (JP); Seiji Kondo, Ibaraki (JP); Hiroyuki Morikazu, Ibaraki (JP); Takashi Shimizu, Ibaraki (JP); Hiroaki Sawada, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 1307 days.

(21) Appl. No.: 13/821,361

(22) PCT Filed: Aug. 31, 2011

(86) PCT No.: PCT/JP2011/069751
§ 371 (c)(1),
(2), (4) Date: Mar. 7, 2013

(87) PCT Pub. No.: WO2012/032984
PCT Pub. Date: Mar. 15, 2012

(65) Prior Publication Data
US 2013/0163080 A1 Jun. 27, 2013

(30) Foreign Application Priority Data

Sep. 9, 2010 (JP) .................. 2010-201528
Aug. 22, 2011 (JP) .................. 2011-180312

(51) Int. Cl.
*B29D 11/00* (2006.01)

(52) U.S. Cl.
CPC ................. *B29D 11/0074* (2013.01)

(58) Field of Classification Search
CPC ............ G02B 5/3033–305; G02B 5/32; B29K 2995/0034; B29K 2029/04
(Continued)

(56) References Cited

U.S. PATENT DOCUMENTS 4,895,769 A * 1/1990 Land et al. .................. 428/483
7,867,414 B2 1/2011 Ishibashi et al.
(Continued)

FOREIGN PATENT DOCUMENTS

CN 1318759 A 10/2001
CN 1453598 A 11/2003
(Continued)

OTHER PUBLICATIONS

Mino, "Optical Member, Manufacturing Method Thereof and Liquid Crystal Display Device", JP 2006163082 A, Jun. 2006, machine translation.*

(Continued)

*Primary Examiner* — Wen Huang
(74) *Attorney, Agent, or Firm* — Westerman, Hattori, Daniels & Adrian, LLP

(57) ABSTRACT

The present invention provides a method of producing a thin polarizing film having both excellent optical characteristics and excellent in-plane uniformity.
The method of producing a thin polarizing film includes stretching a thermoplastic resin substrate in a first direction, followed by formation of a polyvinyl alcohol-based resin layer on the thermoplastic resin substrate to prepare a laminate and shrinking and stretching the laminate in the first direction and a second direction, respectively.

20 Claims, 2 Drawing Sheets

(58) Field of Classification Search
USPC .......................................................... 428/483
See application file for complete search history.

(56) References Cited

U.S. PATENT DOCUMENTS

| | | | |
|---|---|---|---|
| 8,488,082 | B2 | 7/2013 | Nishiguchi et al. |
| 8,559,105 | B2 | 10/2013 | Yoshimi et al. |
| 2006/0078693 | A1 | 4/2006 | Ishibashi et al. |
| 2010/0202051 | A1 | 8/2010 | Yoshimi et al. |
| 2011/0141430 | A1 | 6/2011 | Nishiguchi et al. |
| 2013/0070186 | A1* | 3/2013 | Kunai ............... B29D 11/00644 349/96 |
| 2013/0114027 | A1* | 5/2013 | Hasegawa ............. G02B 5/305 349/96 |
| 2013/0220525 | A1* | 8/2013 | Kunai ............... B29D 11/00644 156/229 |

FOREIGN PATENT DOCUMENTS

| | | |
|---|---|---|
| CN | 101809472 A | 8/2010 |
| JP | H08-012296 B2 | 2/1996 |
| JP | 2000-338329 A | 12/2000 |
| JP | 2003-043257 A | 2/2003 |
| JP | 2006-133720 A | 5/2006 |
| JP | 2006163082 A * | 6/2006 |
| JP | 2008-221782 A | 9/2008 |
| JP | 2009-093074 A | 4/2009 |
| JP | 2009-098653 A | 5/2009 |
| TW | 201011355 A | 3/2010 |

OTHER PUBLICATIONS

International Search Report for PCT/JP2011/069751, dated Oct. 4, 2011.

Chinese Office Action dated Jun. 26, 2014, issued in corresponding Chinese Application No. 201180042898.3; w/English Translation. (19 pages).

Office Action dated May 18, 2016, issued in counterpart Taiwanese Patent Application No. 100132429, with English translation. (8 pages).

Office Action dated Feb. 20, 2017, issued in counterpart Korean Patent Application No. 10-2013-7008904, with English translation. (14 pages).

\* cited by examiner

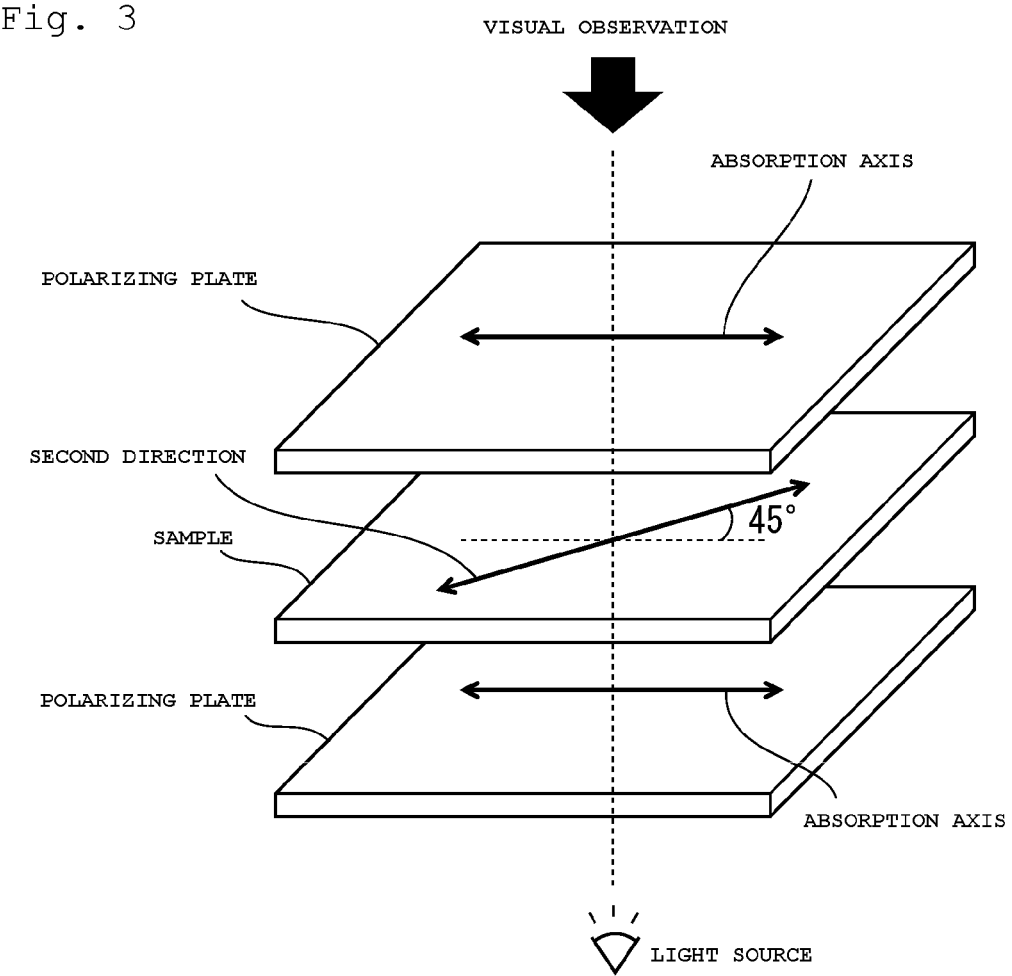

METHOD FOR PRODUCING THIN POLARIZING FILM

TECHNICAL FIELD

The present invention relates to a method of producing a thin polarizing film.

BACKGROUND ART

In recent years, thinning of a polarizing plate has been desired, and hence there has been proposed a method involving stretching a laminate of a thermoplastic resin substrate and a polyvinyl alcohol-based resin layer (hereinafter, referred to as PVA-based resin layer) so that a polarizing film may be obtained (for example, Patent Literature 1). According to such production method, thinning of the PVA-based resin layer is achieved, but there is a problem in that its optical characteristics are low. It is generally known that, in production of the polarizing film, the stretching causes the laminate to shrink in a direction perpendicular to a stretching direction, and it is also known that the optical characteristics can be improved through the shrinkage (Patent Literature 2). However, there is a problem in that, owing to the shrinkage, orientation unevenness occurs and thickness uniformity reduces, and hence the thin polarizing film to be obtained has reduced in-plane uniformity. There is also a problem in that as a shrinkage ratio increases, although the optical characteristics may become favorable, the reduction in in-plane uniformity becomes remarkable, and moreover, a wrinkle becomes liable to occur.

CITATION LIST

Patent Literature

[PTL 1] JP 2000-338329 A
[PTL 2] JP 2003-43257 A

SUMMARY OF INVENTION

Technical Problem

The present invention has been made in order to solve the conventional problems, and a main object of the present invention is to provide a method of producing a thin polarizing film having both excellent optical characteristics and excellent in-plane uniformity.

Means for Solving the Problems

According to one aspect of the present invention, a method of producing a thin polarizing film is provided. The method of producing a thin polarizing film includes stretching a thermoplastic resin substrate in a first direction, followed by formation of a polyvinyl alcohol-based resin layer on the thermoplastic resin substrate to prepare a laminate and shrinking and stretching the laminate in the first direction and a second direction, respectively.

In one embodiment of the invention, the formation of the polyvinyl alcohol-based resin layer is performed by applying an application liquid containing a polyvinyl alcohol-based resin and drying the application liquid and a temperature in the drying is equal to or lower than a glass transition temperature (Tg) of the thermoplastic resin substrate.

In another embodiment of the invention, the first direction and the second direction are perpendicular to each other.

In still another embodiment of the invention, the shrinking and stretching of the laminate is performed while the laminate is conveyed and the first direction includes an MD and the second direction includes a TD.

In still another embodiment of the invention, the shrinking and stretching of the laminate is performed while the laminate is conveyed and the first direction includes a TD and the second direction includes an MD.

In still another embodiment of the invention, a shrinkage ratio of the laminate in the first direction is more than 25%.

In still another embodiment of the invention, a stretching ratio of the laminate in the second direction is 4.0 times or more.

According to another aspect of the invention, an optical laminate is provided. The optical laminate includes a thin polarizing film produced by the method of producing a thin polarizing film and a substrate provided on at least one side of the thin polarizing film.

In one embodiment of the invention, the substrate includes an optical functional film different from the thermoplastic resin substrate. The optical functional film is provided on one side of the thin polarizing film through an adhesive layer.

Advantageous Effects of Invention

According to the present invention, the laminate having the thermoplastic resin substrate subjected to the stretching treatment in the first direction in advance and the PVA-based resin layer is shrunk and stretched in the first direction and the second direction, respectively, to thereby enable the production of the thin polarizing film having both excellent optical characteristics and excellent in-plane uniformity. Specifically, shrinking and stretching the laminate in the first direction and the second direction, respectively, can improve uniaxiality in the second direction, and hence can provide excellent optical characteristics. In addition, the thermoplastic resin substrate subjected to the stretching treatment in the first direction can be ready to return to the state before the stretching by the stretching in second direction, heat, and the like, and hence can be uniformly shrunk in the first direction. Thus, even when the laminate is shrunk at a high shrinkage ratio, excellent in-plane uniformity can be obtained.

BRIEF DESCRIPTION OF DRAWINGS

FIG. 3 is a schematic view illustrating a method of evaluating orientation unevenness.

DESCRIPTION OF EMBODIMENTS

Figure 1:
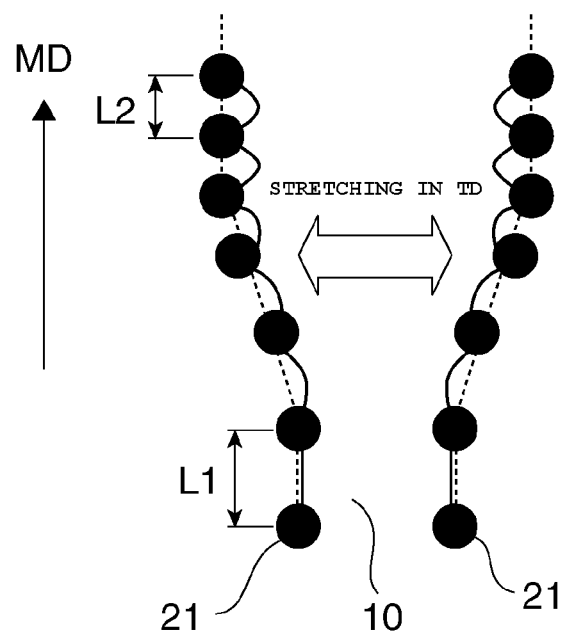
FIG. 1 is a schematic view illustrating a specific example of a shrinking and stretching step.

Hereinafter, preferred embodiments of the present invention are described. However, the present invention is not limited to these embodiments.

A. Method of Producing a Thin Polarizing Film

A method of producing a thin polarizing film according to the present invention includes the steps of: stretching a thermoplastic resin substrate in a first direction, followed by the formation of a PVA-based resin layer on the thermoplastic resin substrate to prepare a laminate (laminate preparing step); and shrinking and stretching the laminate in the first direction and a second direction, respectively (shrinking and stretching step). Hereinafter, each of the steps is described.

A-1. Laminate Preparing Step

The laminate is prepared by stretching a thermoplastic resin substrate in a first direction, followed by the formation of a PVA-based resin layer on the thermoplastic resin substrate. The thermoplastic resin substrate may be of any appropriate construction as long as it can support the PVA-based resin layer and the thin polarizing film to be obtained from one side thereof. The laminate is representatively formed in a lengthy shape.

The thickness of the thermoplastic resin substrate (before the stretching) is preferably 50 μm to 250 μm. When the thickness is less than 50 μm, the substrate may rupture at the time of the stretching. In addition, the thickness may become excessively small after the stretching, and hence conveyance may be difficult. When the thickness is more than 250 μm, an excessively large load may be applied to a stretching machine. In addition, conveyance may be difficult.

As a formation material for the thermoplastic resin substrate, there are given, for example, an ester-based resin such as a polyethylene terephthalate-based resin, a cycloolefin-based resin, an olefin-based resin such as polypropylene, a polyamide-based resin, a polycarbonate-based resin, and a copolymer resin thereof. Of those, a cycloolefin-based resin (e.g., a norbornene-based resin) and an amorphous polyethylene terephthalate-based resin are preferred. Specific examples of the amorphous polyethylene terephthalate-based resin include: a copolymer obtained by additionally using isophthalic acid as a dicarboxylic acid; and a copolymer obtained by additionally using cyclohexanedimethanol as a glycol.

The glass transition temperature (Tg) of the thermoplastic resin substrate is preferably 170° C. or less. The use of such thermoplastic resin substrate enables the stretching of the laminate at such a temperature that the crystallization of the PVA-based resin does not rapidly progress, and can suppress inconvenience due to the crystallization (such as the inhibition of the orientation of the PVA-based resin layer by the stretching). It should be noted that the glass transition temperature (Tg) is a value determined in conformity with JIS K 7121.

As described above, the thermoplastic resin substrate is stretched in the first direction before the formation of the PVA-based resin layer. The first direction may be set to any appropriate direction depending on a desired thin polarizing film. In one embodiment, the first direction is the conveying direction (MD) of the thermoplastic resin substrate. The conveying direction is preferably the lengthwise direction of a lengthy thermoplastic resin substrate, which can encompass directions at −5° to +5° counterclockwise with respect to the lengthwise direction of the thermoplastic resin substrate. In another embodiment, the first direction is a direction (TD) perpendicular to the conveying direction. The direction perpendicular to the conveying direction is preferably the widthwise direction of the lengthy thermoplastic resin substrate, which can encompass directions at 85° to 95° counterclockwise with respect to the lengthwise direction of the thermoplastic resin substrate. It should be noted that the term "perpendicular" as used herein includes "substantially perpendicular." Here, the phrase "substantially perpendicular" includes a case at 90°±5.0°, preferably 90°±3.0°, more preferably 90°±1.0°.

Any appropriate method may be adopted as a method of stretching the thermoplastic resin substrate. Specifically, fixed-end stretching may be adopted, or free-end stretching (such as a method involving passing the thermoplastic resin substrate between rolls having different peripheral speeds to uniaxially stretch the substrate) may be adopted. The stretching of the thermoplastic resin substrate may be performed in one stage, or may be performed in a plurality of stages. When the stretching is performed in a plurality of stages, the stretching ratio of the thermoplastic resin substrate to be described later is the product of stretching ratios in the respective stages. In addition, a stretching mode in this step is not particularly limited and may be an in-air stretching mode, or may be an underwater stretching mode.

The stretching temperature of the thermoplastic resin substrate may be set to any appropriate value depending on, for example, a formation material for the thermoplastic resin substrate and the stretching mode. The stretching temperature is representatively equal to or higher than the glass transition temperature (Tg) of the thermoplastic resin substrate, preferably Tg+10° C. or more, more preferably Tg+15° C. to Tg+30° C. When the underwater stretching mode is adopted as the stretching mode and an amorphous polyethylene terephthalate-based resin is used as the formation material for the thermoplastic resin substrate, the stretching temperature may be set lower than the glass transition temperature (for example, 60° C. to 100° C.) of the thermoplastic resin substrate.

The stretching ratio (first direction) of the thermoplastic resin substrate is preferably 1.5 times or more, more preferably 1.75 times or more with respect to the original length of the thermoplastic resin substrate. Setting the stretching ratio to 1.5 times or more can shrink the laminate to be described later more uniformly. On the other hand, the stretching ratio is preferably 2.5 times or less.

The thermoplastic resin substrate may be subjected to a surface modification treatment (such as a corona treatment) in advance. Alternatively, an easy-adhesion layer may be formed on the thermoplastic resin substrate. Performing such treatment can improve adhesiveness between the thermoplastic resin substrate and the PVA-based resin layer. It should be noted that the surface modification treatment and/or the formation of the easy-adhesion layer may be performed before the stretching, or may be performed after the stretching.

Any appropriate method may adopted as a method of forming the PVA-based resin layer. The PVA-based resin layer is preferably formed by applying an application liquid containing a PVA-based resin onto the thermoplastic resin substrate subjected to the stretching treatment and drying the liquid.

Any appropriate resin may be used as the PVA-based resin. Examples of the resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically 85 mol % to 100 mol %, preferably 95.0 mol % to 99.95 mol %, more preferably 99.0 mol % to 99.93 mol %. The saponification degree may be determined in conformity with JIS K 6726-1994. The use of the PVA-based resin having such saponification degree can provide a thin polarizing film excellent in durability. When the saponification degree is excessively high, the gelling of the application liquid is liable to occur, and hence the formation of a uniform coating film may be difficult.

The average polymerization degree of the PVA-based resin can be appropriately selected depending on purposes. The average polymerization degree is typically 1,000 to 10,000, preferably 1,200 to 4,500, more preferably 1,500 to 4,300. It should be noted that the average polymerization degree can be determined in conformity with JIS K 6726-1994.

The application liquid is representatively a solution prepared by dissolving the PVA-based resin in a solvent. Examples of the solvent include water, dimethylsulfoxide, dimethylformamide, dimethylacetamide, N-methylpyrrolidone, various glycols, polyhydric alcohols such as trimethylolpropane, and amines such as ethylenediamine and diethylenetriamine. One kind of those solvents can be used alone, or two or more kinds thereof can be used in combination. Of those, water is preferred. The concentration of the PVA-based resin of the solution is preferably 3 parts by weight to 20 parts by weight with respect to 100 parts by weight of the solvent. At such resin concentration, a uniform coating film in close contact with the thermoplastic resin substrate can be formed.

The application liquid may be compounded with an additive. Examples of the additive include a plasticizer and a surfactant. Examples of the plasticizer include polyhydric alcohols such as ethylene glycol and glycerin. Examples of the surfactant include nonionic surfactants. Such additive can be used for the purpose of additionally improving the uniformity, dyeing property, or stretchability of the PVA-based resin layer to be obtained.

Any appropriate method can be adopted as a method of applying the application liquid. Examples of the method include a roll coating method, a spin coating method, a wire bar coating method, a dip coating method, a die coating method, a curtain coating method, a spray coating method, and a knife coating method (comma coating method or the like).

The drying temperature is preferably equal to or lower than the glass transition temperature (Tg) of the thermoplastic resin substrate, more preferably Tg-20° C. or less. Drying at such temperature can prevent the thermoplastic resin substrate from deforming before the formation of the PVA-based resin layer, thereby preventing the orientation property of the PVA-based resin layer to be obtained from deteriorating. Thus, the thermoplastic resin substrate can favorably deform together with the PVA-based resin layer, and hence the laminate to be described later can be favorably shrunk and stretched. As a result, favorable orientation property can be imparted to the PVA-based resin layer to provide a thin polarizing film having excellent optical characteristics. The term "orientation property" as used herein means the orientation of the molecular chain of the PVA-based resin layer.

The thickness of the PVA-based resin layer is preferably 3 μm to 20 μm. Even when the layer has such small thickness, the layer can be favorably stretched through the use of the thermoplastic resin substrate. The water content of the PVA-based resin layer is preferably 20% or less, more preferably 15% or less.

A-2. Shrinking and Stretching Step

Next, the laminate is shrunk in the first direction and stretched in the second direction. When the laminate is constructed with the thermoplastic resin substrate subjected to the stretching treatment in the first direction in advance, the thermoplastic resin substrate can be ready to return to the state before the stretching by the stretching in the second direction, heat, and the like, and hence the laminate can be uniformly shrunk in the first direction. Thus, even when the laminate is shrunk at a high shrinkage ratio, excellent in-plane uniformity can be obtained. In addition, shrinking the laminate and stretching it in the second direction can improve uniaxiality in the second direction, and hence excellent optical characteristics can be obtained. It should be noted that the second direction substantially corresponds to the absorption axis direction of the thin polarizing film to be obtained.

The shrinking of the laminate may be performed at the same time with the stretching thereof, or may be performed at a different timing. In addition, the order of the shrinking and the stretching is also not limited and the laminate may be shrunk in one stage, or may be shrunk in a plurality of stages. In one embodiment, it is preferred that the laminate be shrunk in the first direction before being stretched in the second direction. In another embodiment, it is preferred that the laminate be shrunk in the first direction while being stretched in the second direction. As a method of shrinking the laminate separately from the stretching, there is preferably given a method involving heating the laminate (causing the laminate to undergo heat shrinkage). The heating temperature is preferably equal to or higher than the glass transition temperature (Tg) of the thermoplastic resin substrate.

The shrinkage ratio of the laminate in the first direction may be set to any appropriate value. The shrinkage ratio is preferably more than 25%, more preferably more than 30% and less than 50%. Adopting such shrinkage ratio can provide additionally excellent optical characteristics. In addition, even when the laminate is shrunk at such high shrinkage ratio, excellent in-plane uniformity can be obtained. It should be noted that the first direction is as described above.

The second direction may be set to any appropriate direction depending on a desired thin polarizing film. It is preferred that the second direction and the first direction be perpendicular to each other. Specifically, when the first direction is the conveying direction (MD) of the thermoplastic resin substrate, the second direction is preferably the direction (TD) perpendicular to the conveying direction. When the first direction is the direction (TD) perpendicular to the conveying direction, the second direction is preferably the conveying direction (MD).

Any appropriate method may be adopted as a method of stretching the laminate. Specifically, fixed-end stretching may be adopted, or free-end stretching (such as a method involving passing the laminate between rolls having different peripheral speeds to uniaxially stretch the laminate) may be adopted. The stretching of the laminate may be performed in one stage, or may be performed in a plurality of stages. When the stretching is performed in a plurality of stages, the stretching ratio of the laminate to be described later is the product of stretching ratios in the respective stages. In addition, a stretching mode in this step is not particularly limited and may be an in-air stretching mode, or may be an underwater stretching mode.

The stretching temperature of the laminate may be set to any appropriate value depending on, for example, a formation material for the thermoplastic resin substrate. The stretching temperature is representatively equal to or higher than the glass transition temperature (Tg) of the thermoplastic resin substrate, preferably higher than the glass transition temperature (Tg) of the thermoplastic resin substrate by 10° C. or more, more preferably higher than the Tg by 15° C. or more. Meanwhile, the stretching temperature of the laminate is preferably 170° C. or less. Performing the stretching at such temperature suppresses rapid progress of the crystallization of the PVA-based resin, thereby enabling the suppression of an inconvenience due to the crystallization (such as the inhibition of the orientation of the PVA-based resin layer by the stretching).

When the underwater stretching mode is adopted as the stretching mode, the stretching temperature is preferably 85° C. or less, more preferably 30° C. to 65° C. When the stretching temperature is more than 85° C., an inconvenience such as the elution of iodine which the PVA-based resin is caused to adsorb or the elution of the PVA-based resin may occur, and hence the optical characteristics of the thin polarizing film to be obtained may reduce. In this case, a thermoplastic resin substrate that can be stretched even at the temperature is selected. It is preferred to use, as a formation material therefor, an amorphous polyethylene terephthalate-based resin, an olefin-based resin (such as polymethylpentene), or the like.

When the underwater stretching mode is adopted, the laminate is preferably stretched in an aqueous solution of boric acid. The use of the aqueous solution of boric acid can impart, to the PVA-based resin layer, rigidity enough to withstand a tension to be applied at the time of the stretching and such water resistance that the layer does not dissolve in water. Specifically, boric acid can produce a tetrahydroxyborate anion in the aqueous solution to cross-link with the PVA-based resin through a hydrogen bond, and hence can impart the rigidity and the water resistance. As a result, for example, the realization of an additionally high polarizing film contrast ratio can be achieved. The aqueous solution of boric acid is obtained by dissolving boric acid and/or a borate in water as a solvent. The concentration of boric acid is generally 1 part by weight to 10 parts by weight with respect to 100 parts by weight of water. The immersion time of the laminate in a stretching bath is preferably about 15 seconds to 5 minutes.

The stretching ratio (second direction) of the laminate is preferably 4.0 times or more with respect to the original length of the laminate. Shrinking the laminate in the first direction enables the stretching at such high ratio. As a result, a thin polarizing film having excellent optical characteristics can be obtained. On the other hand, an upper limit for the stretching ratio in stretching in one stage is about 5.0 times. This is because the laminate may rupture.

FIG. 1 illustrates a specific example of the shrinking and stretching step. In the example illustrated in the figure, while the laminate 10 is conveyed in its lengthwise direction, the laminate 10 is shrunk in the conveying direction (MD) and stretched in the direction (TD) perpendicular to the conveying direction with a simultaneous biaxial stretching machine. Specifically, the laminate 10 held with left and right clips 21, 21 at a tenter inlet is stretched in the TD while being conveyed at a predetermined speed. In the example illustrated in the figure, the shrinkage of the laminate is controlled by, for example, gradually reducing the moving speed of each clip in the conveying direction to shorten a distance between the clips. The shrinkage ratio can be controlled by adjusting a distance L1 between the clips at the tenter inlet in the conveying direction and a distance L2 between the clips at a tenter outlet in the conveying direction (the moving speed of each clip in the conveying direction). Specifically, a desired shrinkage ratio can be achieved by setting the speed of each clip at the tenter outlet to the product of its speed at the tenter inlet and the shrinkage ratio. It should be noted that a broken line in FIG. 1 represents the rail of the clip 21.

When the laminate is shrunk and stretched with the simultaneous biaxial stretching machine as illustrated in FIG. 1, the laminate is preferably shrunk before being stretched. Specifically, the distance between the clips in the conveying direction is shortened before the laminate is stretched in the TD. According to such embodiment, a force is applied to the laminate upon stretching in an additionally uniform fashion, and hence a portion held with each clip can be prevented from being selectively stretched. Specifically, a portion not held with any clip can be prevented from curving inward at an edge side of the laminate. As a result, uniformity can be improved.

Figure 2:
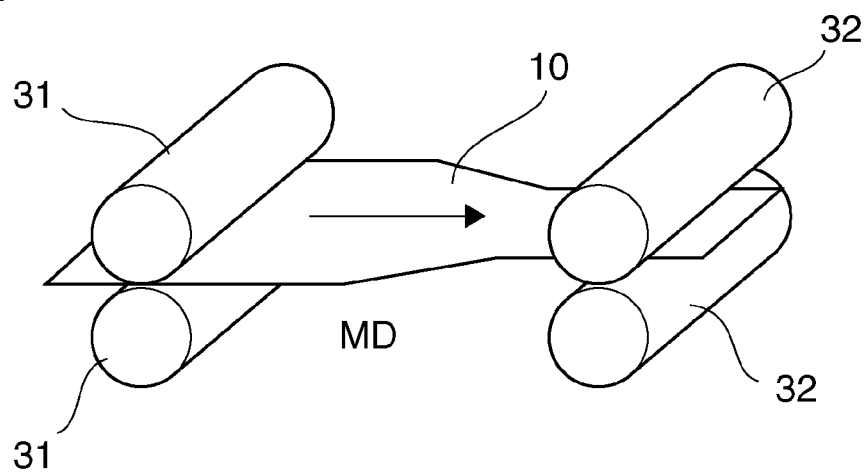
FIG. 2 is a schematic view illustrating another specific example of the shrinking and stretching step.

FIG. 2 illustrates another specific example of the shrinking and stretching step. In the example illustrated in the figure, while the laminate 10 is conveyed in its lengthwise direction, the laminate 10 is passed through rolls 31, 31, 32, 32 having different peripheral speeds so as to be stretched in the conveying direction (MD). At that time, the laminate can shrink in the first direction (TD). The shrinkage is probably caused by neck-in due to the stretching in the MD and neck-in (heat shrinkage) due to heat upon the stretching in the MD. The shrinkage ratio can be controlled by controlling stretching conditions in this step, stretching conditions for the thermoplastic resin substrate, and the like.

A-3. Any Other Step

The method of producing a thin polarizing film according to the present invention may include any other step in addition to the above-mentioned steps. Examples of the other step include an insolubilizing step, a dyeing step, a cross-linking step, the stretching step different from the above-mentioned stretching step, a washing step, and a drying (moisture content adjusting) step. The other step may be performed at any appropriate timing.

The dyeing step is representatively a step of dyeing the PVA-based resin layer with a dichromatic substance. The dyeing is preferably performed by causing the PVA-based resin layer to adsorb the dichromatic substance. As a method for the adsorption, there are given, for example, a method involving immersing the PVA-based resin layer (laminate) in a dyeing liquid containing the dichromatic substance, a method involving applying the dyeing liquid onto the PVA-based resin layer, and a method involving spraying the dyeing liquid onto the PVA-based resin layer. Of those, a method involving immersing the laminate in a dyeing liquid containing the dichromatic substance is preferred. This is because the dichromatic substance can favorably adsorb to the layer. It should be noted that, in the dyeing liquid, both surfaces of the laminate may be immersed or only one surface thereof may be immersed.

Examples of the dichromatic substance include iodine and an organic dye. Those substances may be used alone or in combination of two or more kinds thereof. Iodine is preferred as the dichromatic substance. When iodine is used as the dichromatic substance, the dyeing liquid is preferably an aqueous solution of iodine. The compounding amount of iodine is preferably 0.1 part by weight to 1.0 part by weight with respect to 100 parts by weight of water. The aqueous solution of iodine is preferably compounded with an iodide in order that the solubility of iodine in water may be increased. Examples of the iodide include potassium iodide, lithium iodide, sodium iodide, zinc iodide, aluminum iodide, lead iodide, copper iodide, barium iodide, calcium iodide, tin iodide, and titanium iodide. Of those, potassium iodide and sodium iodide are preferred. The compounding amount of the iodide is preferably 0.3 part by weight to 15 parts by weight with respect to 100 parts by weight of water.

The liquid temperature of the dyeing liquid at the time of the dyeing is preferably 20° C. to 40° C. When the PVA-based resin layer is immersed in the dyeing liquid, an immersion time is preferably 5 seconds to 300 seconds. Under such conditions, the PVA-based resin layer can be sufficiently caused to adsorb the dichromatic substance.

The insolubilizing step and the cross-linking step are representatively performed by immersing the PVA-based resin layer in an aqueous solution of boric acid. The washing step is representatively performed by immersing the PVA-based resin layer in an aqueous solution of potassium iodide. A drying temperature in the drying step is preferably 30° C. to 100° C.

B. Thin Polarizing Film

A thin polarizing film of the present invention is produced by the above-mentioned production method. The thin polarizing film of the present invention is substantially a PVA-based resin film that adsorbs and orients a dichromatic substance. The thin polarizing film preferably shows absorption dichroism at any wavelength in the wavelength range of 380 nm to 780 nm. The thickness of the thin polarizing film is preferably less than 10 μm, more preferably 0.5 μm to 5 μm.

Any appropriate method may be adopted as a usage of the thin polarizing film. Specifically, the thin polarizing film may be used in a state of being integrated with the thermoplastic resin substrate, or may be used after being transferred from the thermoplastic resin substrate to any other member (after the release of the thermoplastic resin substrate).

C. Optical Laminate

An optical laminate of the present invention has the thin polarizing film, and a substrate provided on at least one side of the thin polarizing film and capable of supporting the thin polarizing film. As the substrate, the thermoplastic resin substrate may be used as it is, or an optical functional film different from the thermoplastic resin substrate may be used. As a formation material for the optical functional film, for example, the same material as that for the thermoplastic resin is used. Alternatively, for example, a (meth)acrylic resin or a cellulose-based resin such as diacetylcellulose or triacetylcellulose is used.

The optical functional film is preferably provided on one side of the thin polarizing film through an adhesive layer. The provision of the optical functional film can suppress curling. The thickness of the optical functional film is preferably 20 μm to 100 μm. When the optical functional film is used, the thermoplastic resin substrate provided on one side of the thin polarizing film in advance is preferably released. This is because curling can be suppressed in an additionally reliable manner. The adhesive layer is formed by any appropriate adhesive. Examples of the adhesive include a polyvinyl alcohol-based adhesive.

The optical laminate (thin polarizing film) of the present invention has small shrinkage stress and can be excellent in dimensional stability even under a high temperature environment. In addition, its polarization degree at a single axis transmittance of 41% is preferably 99.9% or more. As such, the optical laminate (thin polarizing film) can be excellent in optical characteristics.

EXAMPLES

Hereinafter, the present invention is specifically described by way of examples. However, the present invention is not limited by these examples.

Example 1

<Preparation of Laminate>
(Thermoplastic Resin Substrate)

A lengthy cycloolefin-based resin film (manufactured by JSR, trade name "ARTON") having a thickness of 150 μm and a Tg of 123° C. was used as a thermoplastic resin substrate.

The thermoplastic resin substrate was passed between rolls having different peripheral speeds to be subjected to in-air stretching in a first direction (MD). In this case, the stretching temperature was 140° C. and the stretching ratio was 2.0 times.

(Preparation of Application Liquid)

An aqueous solution containing polyvinyl alcohol at a concentration of 7 wt % was prepared by dissolving a polyvinyl alcohol (PVA) resin (manufactured by The Nippon Synthetic Chemical Industry Co., Ltd., trade name "Gohsenol (trademark) NH-18") having a polymerization degree of 1,800 and a saponification degree of 98 to 99% in water.

(Formation of PVA-Based Resin Layer)

The application liquid was applied onto one surface of the thermoplastic resin substrate subjected to a stretching treatment with a die coater (die coating method). After that, the resultant was dried at 100° C. for 180 seconds so that a PVA-based resin layer having a thickness of 7 μm was formed. Thus, a laminate was prepared.

<Shrinking and Stretching Treatment>

The resultant laminate was shrunk at 140° C. in the first direction (MD) by 50%, and at the same time, was subjected to in-air stretching in a second direction (TD) at a ratio of 4.5 times with a simultaneous biaxial stretching machine as illustrated in FIG. 1. Specifically, a distance L1 between clips in the conveying direction at a tenter inlet was set to 144 mm, and a distance L2 between the clips in the conveying direction at a tenter outlet was set to 72 mm.

<Dyeing Treatment>

Next, the laminate was immersed in an aqueous solution of iodine at 25° C. (iodine concentration: 0.5 wt %, potassium iodide concentration: 10 wt %) for 30 seconds.

<Cross-Linking Treatment>

After the dyeing, the laminate was immersed in an aqueous solution of boric acid at 60° C. (boric acid concentration: 5 wt %, potassium iodide concentration: 5 wt %) for 60 seconds.

<Washing Treatment>

After the cross-linking treatment, the laminate was immersed in an aqueous solution of potassium iodide at 25° C. (potassium iodide concentration: 5 wt %) for 5 seconds.

Thus, a thin polarizing film having a thickness of 3.1 μm was produced on the thermoplastic resin substrate.

Example 2

A laminate was prepared in the same manner as in Example 1 except that the thermoplastic resin substrate was subjected to fixed-end stretching in the first direction (TD) with a tenter stretching machine.

The resultant laminate was passed between rolls having different peripheral speeds to be shrunk in the first direction (TD) by 50%, and at the same time, subjected to in-air stretching in the second direction (MD) at a ratio of 4.5 times. In this case, the stretching temperature was 140° C.

After that, the dyeing treatment, the cross-linking treatment, and the washing treatment were performed in the same manner as in Example 1 to produce a thin polarizing film having a thickness of 3.0 μm on the thermoplastic resin substrate.

Example 3

A thin polarizing film was produced in the same manner as in Example 1 except that, in the shrinking and stretching treatment, the shrinkage ratio in the first direction was changed to 35% (L1: 111 mm, L2: 72 mm).

The thickness of the resultant thin polarizing film was 2.4 µm.

Example 4

A thin polarizing film was produced in the same manner as in Example 1 except that, in the shrinking and stretching treatment, the shrinkage ratio in the first direction was changed to 28% (L1: 100 mm, L2: 72 mm).

The thickness of the resultant thin polarizing film was 2.2 µm.

Comparative Example 1

A thin polarizing film was produced in the same manner as in Example 1 except that the thermoplastic resin substrate was not subjected to the stretching treatment.

The thickness of the resultant thin polarizing film was 3.1 µm.

Comparative Example 2

A thin polarizing film was produced in the same manner as in Example 2 except that the thermoplastic resin substrate was not subjected to the stretching treatment.

The thickness of the resultant thin polarizing film was 3.0 µm.

Comparative Example 3

A thin polarizing film was produced in the same manner as in Example 3 except that the thermoplastic resin substrate was not subjected to the stretching treatment.

The thickness of the resultant thin polarizing film was 2.4 µm.

Comparative Example 4

A thin polarizing film was produced in the same manner as in Example 4 except that the thermoplastic resin substrate was not subjected to the stretching treatment.

The thickness of the resultant thin polarizing film was 2.2 µm.

Comparative Example 5

A thin polarizing film was produced in the same manner as in Example 1 except that the thermoplastic resin substrate was not subjected to the stretching treatment and, in the shrinking and stretching treatment, was not shrunk in the first direction (the shrinkage ratio was changed to 0%).

The thickness of the resultant thin polarizing film was 1.6 µm.

Comparative Example 6

The production of a thin polarizing film was attempted in the same manner as in Example 1 except that, in the shrinking and stretching treatment, the laminate was not shrunk in the first direction (the shrinkage ratio was changed to 0%).

The thin polarizing film (laminate) obtained in each of Examples and Comparative Example was evaluated. Evaluation methods and evaluation criteria are as described below. Table 1 shows the results of the measurement.

1. In-Plane Uniformity 1-1. Wrinkle

The presence or absence of a wrinkle was evaluated through visual observation.

(Evaluation Criteria)

⊚: No wrinkle is present.

o: A wrinkle is present at an edge portion.

x: Wrinkles are present throughout the surface.

1-2. Orientation Unevenness

The laminate before the dyeing was evaluated. As illustrated in FIG. 3, commercially available polarizing plates were laminated on the top and bottom of the laminate (sample), respectively, and the laminate in this state was irradiated with light from the bottom and visually observed from the above to evaluate its orientation unevenness. In this case, the two polarizing plates were disposed so that their absorption axes were parallel to each other, and that the second direction (stretching direction) of the laminate formed an angle of 45° with respect to the absorption axes of the polarizing plates.

(Evaluation Criteria)

⊚: No orientation unevenness is present.

o: Orientation unevenness is present at an edge portion.

x: Orientation unevenness is present throughout the surface.

1-3. Thickness Distribution

Thickness distribution in the widthwise direction (TD direction) at a width of 1,450 mm was evaluated with a dial gauge (manufactured by PEACOCK, product name "DG-205 type pds-2").

(Evaluation Criteria)

⊚: Within ±1 µm o: Less than ±2 µm x: ±2 µm or more

2. Polarization Degree

The single axis transmittance (Ts), parallel transmittance (Tp), and crossed transmittance (Tc) of the thin polarizing film (optical laminate) were measured with a spectrophotometer (manufactured by Murakami Color Research Laboratory, product name "Dot-41"), and then its polarization degree (P) at a single axis transmittance of 41% was determined from the following equation. It should be noted that those transmittances are Y values measured with the two-degree field of view (C light source) of JIS Z 8701 and subjected to visibility correction.

$$\text{Polarization degree } (P) = \{(Tp-Tc)/(Tp+Tc)\}^{1/2} \times 100$$

(Evaluation Criteria)

⊚: 99.95% or more o: 99.93% or more x: 99.8% or less

TABLE 1

| | Thermoplastic resin substrate | Laminate | | In-plane uniformity | | | |
|---|---|---|---|---|---|---|---|
| | Stretching ratio | Shrinkage ratio | Stretching ratio | Wrinkle | Orientation unevenness | Thickness distribution | Polarization degree |
| Example 1 | 2.0 | 50 | 4.5 | ○ | ○ | ○ | ◎ |
| Example 2 | 2.0 | 50 | 4.5 | ○ | ○ | ○ | ◎ |
| Example 3 | 2.0 | 35 | 4.5 | ◎ | ◎ | ◎ | ◎ |
| Example 4 | 2.0 | 28 | 4.5 | ◎ | ◎ | ◎ | ○ |
| Comparative Example 1 | — | 50 | 4.5 | X | X | X | ◎ |
| Comparative Example 2 | — | 50 | 4.5 | X | X | X | ◎ |
| Comparative Example 3 | — | 35 | 4.5 | X | X | X | ◎ |
| Comparative Example 4 | — | 28 | 4.5 | X | X | X | ○ |
| Comparative Example 5 | — | 0 | 4.5 | ○ | ○ | ○ | X |
| Comparative Example 6 | 2.0 | 0 | 4.5 | — | — | — | — |

It can be seen from Examples 1 to 4 and Comparative Examples 1 to 4 that as the shrinkage ratio of the laminate is higher, a thin polarizing film more excellent in optical characteristics can be obtained. On the other hand, in each of Comparative Examples 1 to 4, in which the thermoplastic resin substrate was not subjected to the stretching treatment, in-plane uniformity was low and a wrinkle occurred as well. Specifically, the shrinkage ratio was larger at an edge portion of the laminate than at a central portion thereof, and hence the laminate was not shrunk uniformly. When Examples 1 to 4 are compared to Comparative Examples 1 to 4, respectively, it is revealed that, when the thermoplastic resin substrate is subjected to the stretching treatment in advance, a thin polarizing film having both excellent optical characteristics and excellent in-plane uniformity can be obtained.

It can be seen from Comparative Example 5 that shrinking and stretching the laminate in the first direction and the second direction, respectively, can provide a thin polarizing film excellent in optical characteristics. This is probably because the shrinking in the first direction improved uniaxiality in the second direction. It should be noted that, in Comparative Example 6, it was impossible to stretch the laminate in the second direction to 4.5 times.

Example 5

A substrate (manufactured by Fujifilm Corporation, trade name "TD80UL") having a thickness of 80 μm was attached to a surface of the thin polarizing film obtained in Example 3 through a vinyl alcohol-based adhesive. After that, the thermoplastic resin substrate was released. Thus, an optical laminate was obtained.

The optical laminate of each of Examples 1 to 5 and Comparative Examples 1 to 5 was measured for its degree of curling. Specifically, a test piece (10 cm long by 10 cm wide) was cut out of the resultant optical laminate. The resultant test piece was placed on a glass sheet with its convex surface facing downward, the height of the test piece from the glass sheet was measured at each of the four corners. The largest of the values at the four corners was used for evaluation.

In each of Examples 1 to 4 and Comparative Examples 1 to 5, the height was 20 mm or more. In contrast, in Example 5, the height was less than 10 mm, meaning that curling was favorably suppressed.

INDUSTRIAL APPLICABILITY

The thin polarizing film of the present invention is suitably used for liquid crystal panels of, for example, liquid crystal televisions, liquid crystal displays, cellular phones, digital cameras, video cameras, portable game machines, car navigation systems, copying machines, printers, facsimile machines, clockes, and microwave ovens.

REFERENCE SIGNS LIST 10 laminate

The invention claimed is:

1. A method of producing a thin polarizing film, comprising:
   stretching a thermoplastic resin substrate in a first direction, followed by
   formation of a polyvinyl alcohol-based resin layer on the thermoplastic resin substrate to prepare a laminate;
   shrinking and stretching the laminate in the first direction and a second direction, respectively; and
   releasing the thermoplastic resin substrate from the laminate.

2. The method of producing a thin polarizing film according to claim 1, wherein: the formation of the polyvinyl alcohol-based resin layer is performed by applying an application liquid containing a polyvinyl alcohol-based resin and drying the application liquid; and a temperature in the drying is equal to or lower than a glass transition temperature (Tg) of the thermoplastic resin substrate.

3. The method of producing a thin polarizing film according to claim 1, wherein the first direction and the second direction are perpendicular to each other.

4. The method of producing a thin polarizing film according to claim 1, wherein: the shrinking and stretching of the laminate is performed while the laminate is conveyed; and the first direction comprises an MD and the second direction comprises a TD.

5. The method of producing a thin polarizing film according to claim 1, wherein: the shrinking and stretching of the laminate is performed while the laminate is conveyed; and the first direction comprises a TD and the second direction comprises an MD.

6. The method of producing a thin polarizing film according to claim 1, wherein a shrinkage ratio of the laminate in the first direction is more than 25%.

7. The method of producing a thin polarizing film according to claim 1, wherein a stretching ratio of the laminate in the second direction is 4.0 times or more.

8. The method of producing a thin polarizing film according to claim 1, wherein prior to stretching the thermoplastic resin substrate, the thermoplastic resin substrate has a thickness of 50 μm to 250 μm.

9. The method of producing a thin polarizing film according to claim 1, wherein the thermoplastic resin substrate comprises a material selected from the group consisting of an ester-based resin, a polyethylene terephthalate-based resin, a cycloolefin-based resin, an olefin-based resin, a polyamide-based resin, a polycarbonate-based resin, and a copolymer resin thereof.

10. The method of producing a thin polarizing film according to claim 1, wherein a stretching ratio of the thermoplastic resin substrate in the first direction is 1.5 times to 2.5 times, with respect to the original length of the thermoplastic resin substrate.

11. The method of producing a thin polarizing film according to claim 1, wherein prior to formation of the polyvinyl alcohol-based resin layer on the thermoplastic resin substrate, the thermoplastic resin substrate undergoes a surface modification treatment.

12. The method of producing a thin polarizing film according to claim 1, wherein prior to formation of the polyvinyl alcohol-based resin layer on the thermoplastic resin substrate, an easy-adhesion layer is formed on the thermoplastic resin substrate.

13. The method of producing a thin polarizing film according to claim 1, wherein the polyvinyl alcohol-based resin layer has a thickness of 3 μm to 20 μm, prior to the shrinking and stretching the laminate.

14. The method of producing a thin polarizing film according to claim 1, wherein the laminate undergoes shrinking and then the laminate is stretched.

15. The method of producing a thin polarizing film according to claim 1, wherein the laminate is simultaneously undergoing shrinking and stretching.

16. The method of producing a thin polarizing film according to claim 1, wherein in shrinking and stretching the laminate, the laminate undergoes a heat treatment capable of shrinking the laminate.

17. The method of producing a thin polarizing film according to claim 1, wherein a shrinkage ratio of the laminate in the first direction is more than 25% to less than 50%.

18. The method of producing a thin polarizing film according to claim 1, wherein the laminate is stretched at a temperature of up to 170° C.

19. The method of producing a thin polarizing film according to claim 1, further comprising another step, wherein the another step is selected from the group consisting of an insolubilizing step, a dyeing step, a cross-linking step, a second stretching step, a washing step, and a moisture content adjusting step.

20. The method of producing a thin polarizing film according to claim 1, wherein the thin polarizing film has a thickness of 0.5 μm to 10 μm.

* * * * *